June 4, 1946.  B. E. LUBOSHEZ  2,401,691
PHOTOELECTRIC RANGE FINDER
Filed July 18, 1941  2 Sheets-Sheet 1
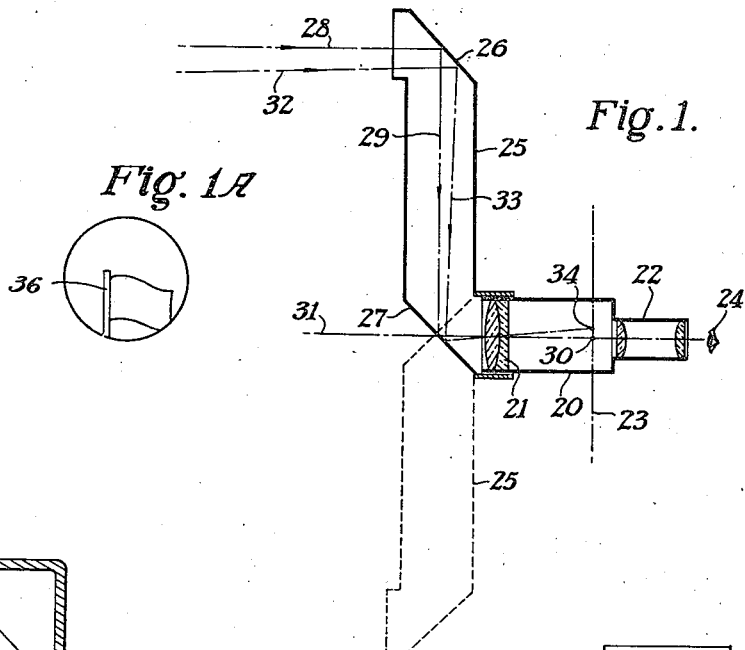
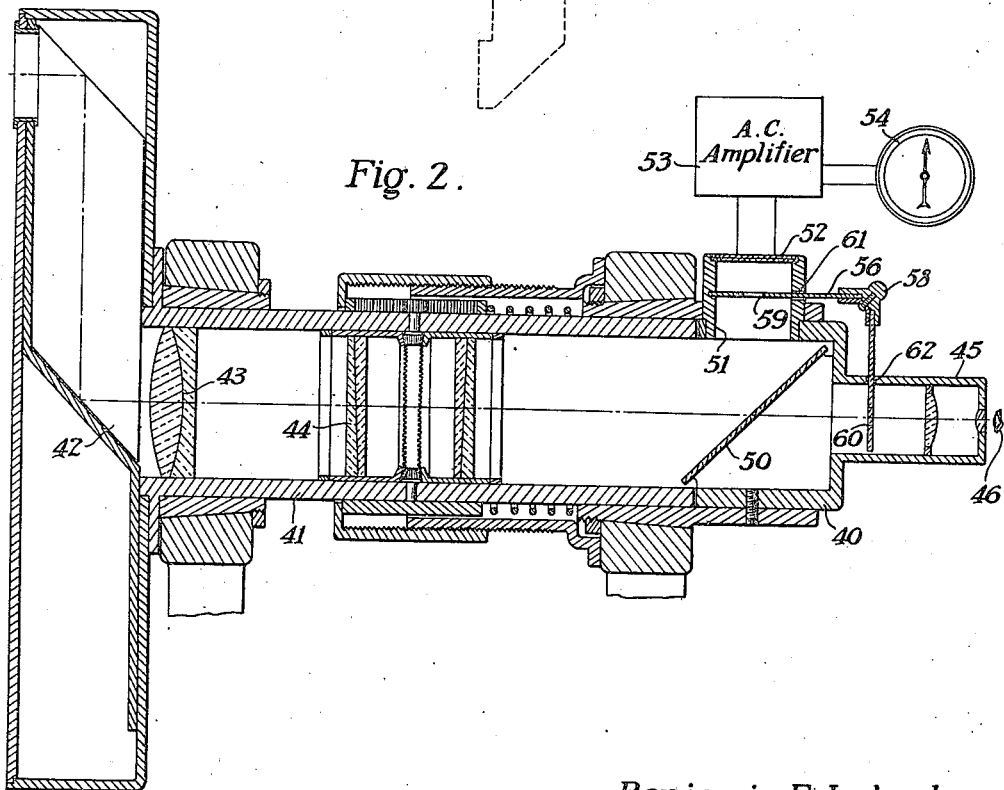
Benjamin E. Luboshez
INVENTOR
BY
ATTORNEY June 4, 1946.　　　B. E. LUBOSHEZ　　　2,401,691
PHOTOELECTRIC RANGE FINDER
Filed July 18, 1941　　2 Sheets-Sheet 2

Benjamin E. Luboshez
INVENTOR

BY

ATTORNEY

Patented June 4, 1946

2,401,691

UNITED STATES PATENT OFFICE 2,401,691

PHOTOELECTRIC RANGE FINDER

Benjamin E. Luboshez, Rochester, N. Y., assignor to Eastman Kodak Company, Rochester, N. Y., a corporation of New Jersey Application July 18, 1941, Serial No. 402,985

5 Claims. (Cl. 88—2.7)

This invention relates to range finders and particularly to a modification of the moving viewpoint type range finder described in my copending application, Serial No. 402,982, filed concurrently herewith.

It is also useful with the other forms of moving viewpoint range finders described in my copending applications Serial Nos. 402,983, 402,984, and 402,986 also filed concurrently herewith.

It is an object of the invention to provide a method and means for extreme accuracy in range finding.

It is a particular object of the invention to provide a method for easy and accurate determination of the point at which image motion is stopped in a moving viewpoint type of range finder.

According to the invention a photoelectric cell is positioned to receive a portion of the image striking the image plane of a moving viewpoint type range finder. By careful selection of the portion of the image to be transmitted to the photoelectric cell, the total light reaching the cell varies in intensity only when the image of the object whose range is to be found is moving. In practice this is done by selecting a portion of the object adjacent a uniform background. When the image of this portion of the object is moving, the ratio of object image to background image changes and hence the intensity of the light changes. When the image motion eliminator of the moving viewpoint range finder is adjusted to the point in which there is no image motion, the intensity of the light reaching the cell remains constant and the output of this cell is void of any alternating current component. Thus the invention provides a method and means for easy detection of when image motion is completely stopped.

The invention will be fully understood from the following description when read in connection with the accompanying drawings, in which:

Fig. 1 illustrates the principle of moving viewpoint range finders.

Fig. 1A shows the field of view as seen through the instrument.

Fig. 2 is a cross section of one embodiment of the invention.

Figure 3:
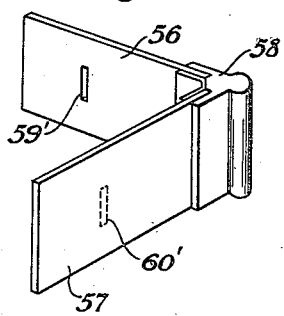
Figure 4:
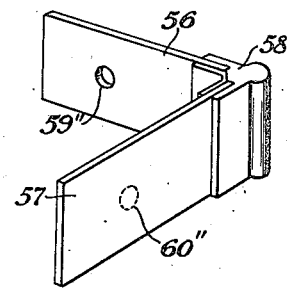
Figure 5:
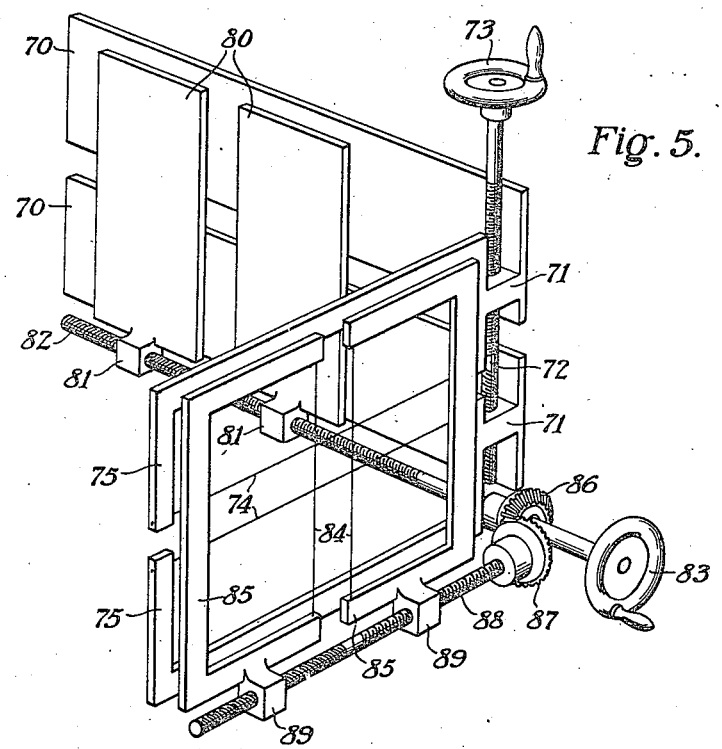

Figs. 3, 4, and 5 show various forms of diaphragms for use in the embodiment shown in Fig. 2.

In Fig. 1 a moving viewpoint range finder is provided with a housing 20, an objective 21 for forming in its focus plane 23 an image of the object whose range is to be found and an eyepiece 22 through which the eye 24 of the observer may view the image plane 23. On the front of the housing 20 is mounted a rotating arm 25 with reflecting surfaces 26 and 27 for directing light from the object to the objective 21. The objective 21 may be anywhere in the light path between the object and the focus plane depending on its focal length. It may be between the reflectors 26 and 27 or in front of reflectors 26. For objects on the rotation axis 31 of the rotating member 25, which substantially coincides with at least part of the optic axis of the objective 21, the position of the image in the image plane depends on the distance of the object from the instrument. In this figure there is no reflection of the optic axis of the objective between the image plane and the rotation axis 31 which is thus also the optic axis at the image plane. For example objects at infinity send rays 28 and 29 to form an image at the point 30 on the optic axis (which coincides with the rotation axis 31), whereas a nearer object sends rays 32 and 33 to form an image at the point 34 to one side of the optic axis. As the rotating arm 25 is rotated, this image 34 moves in a circular motion relative to the optic axis of the objective. All other points on the object at the same distance from the instrument also move with a circular motion, the image remaining inverted in the image plane. If the reflecting surface 27 is adjustable or if some other light deviating means such as a variable power wedge is provided to deviate the light so that the point 34 falls on the optic axis, any motion during rotation of the rotating arm 25 will be eliminated. The adjustment of the light deviating means is a measure of the distance of the object whose range is to be found. Various forms of such a moving viewpoint range finder are described in my copending applications mentioned above.

In Fig. 1A is shown the field of view when ranging on a flag, for example. When the instrument is operated, the image 36 rotates without changing its orientation until the instrument is adjusted to eliminate this motion.

In the arrangement shown in Fig. 2 the range finder is made of a rigid portion 40 and a rotating portion 41. A prism 42 carrying both reflecting surfaces is rotated with the rotating tube 41 and transmits light through an objective 43 and through an adjustable light deviating wedge consisting of two oppositely rotated similar wedges 44 to the focus plane of an eyepiece 45 for viewing by the eye 46 of an observer.

According to this embodiment of the invention a semitransparent mirror 50 is provided for reflecting a portion of the light through an aperture 51 to a photoelectric cell 52. The alternating current output of the photoelectric cell is passed through an A. C. amplifier 53 to a meter 54. Thus the image is divided into two portions, one in focus at the focus plane of the eyepiece 45 and the other focused in front of the photoelectric cell 52. A unit consisting of a diaphragm 56 and a transparent plate 57 supported by frame 58 is placed simultaneously in both image planes. Slots 61 and 62 are provided in the rigid portion 40 of the housing to receive this unit. The diaphragm 56 contains an aperture 59 for transmitting to the photoelectric cell 52 a portion of the image, which portion is one which varies in intensity only when the image is moving. The transparent plate 57 carries fiducial lines 60 which correspond exactly to the edges of the aperture 59. Thus the eye 46 of the observer can detect exactly what portion of the image is being transmitted to the photoelectric cell 52.

In practice, the observer viewing through the eyepiece 45 adjusts the light deviating means 44 until all motion of the image of the object whose range is to be found is apparently stopped. Then for increased accuracy, a portion of the image is selected by moving the whole instrument until the portion desired appears inside the fiducial lines 60. In general, this is done by taking a portion of the image against a neutral background such as the sky. In this arrangement, any residual motion of the image will cause a variation in intensity of the light striking the photoelectric cell 52 which variation will result in an alternating current component in the output of this photoelectric cell which component is indicated on the meter 54.

Alternatively, the eyepiece 45 may be used solely for the selection of the image to be tested, i. e. for the selection of the portion inside the fiducial lines 60 and the measurements made entirely photoelectrically. Obviously, any form of beam splitter may be used in place of the semitransparent mirror 50, since the sole purpose of this element is to provide two image planes one for viewing and the other for masking in front of the photoelectric cell.

If the object is such that it is dfficult to select portions with varying intensity as required, when using the particular diaphragm aperture 59, a different diaphragm may be inserted as shown in Figs. 3 and 4. In Fig. 3 the aperture 59' is an elongated vertical one and the fiducial lines 60' are shaped to correspond to this aperture. In Fig. 4 the aperture 59" is a circular one and the fiducial line 60" is a circle. Fig. 5 shows an arrangement for adjusting the aperture over the photoelectric cell and for simultaneously and similarly adjusting the fiducial lines in the image plane of the eyepiece. The top and bottom of the aperture are defined by masks 70 carried on nuts 71 whose separation is adjustable by a double screw 72 which may be turned by a hand wheel 73. The nuts 71 also support horizontal fiducial wires 74 carried on U-frames 75.

Similarly, the sides of the aperture are defined by masks 80 carried on nuts 81 whose separation is adjustable by a double screw 82 turned by a hand wheel 83. The corresponding fiducial wires 84 are carried on U-frames 85 which are adjusted by nuts 89 mounted on a double screw 88. The screws 82 and 88 are simultaneously adjusted through bevel gears 86 and 87 by the crank wheel 83. This adjustable unit may replace the diaphragm 56 and transparent plate 57 in the embodiment of the invention shown in Fig. 2.

This range finder is not confined to use with visible light, but may utilize infra red rays or other invisible rays. Thus at night or when the visibility is poor, the position of an aircraft can first be determined by sound or other direction finder and then the range can be obtained with the present instrument utilizing the infra red rays emitted by the motor and exhaust gases.

Having thus described one embodiment of my invention, I wish to point out that it is not limited to these structures, but is of the scope of the appended claims.

What I claim and desire to secure by Letters Patent of the United States is:

1. A range finder comprising an objective for forming in its focus plane an image of the object whose range is to be found, means for viewing the image plane, means for shifting the effective viewpoint of the objective along a repetitive path while keeping the focus plane fixed, adjustable means coupled to said shifting means for controlling the movement of said image in the focus plane, a photoelectric cell behind a portion of said focal plane, a diaphragm in the focus plane in front of the cell for transmitting a portion of the image which varies in intensity only when the image of the object is moving, means for showing in the viewing means the portion of the image transmitted through the diaphragm aperture, and scale means for indicating the range when the control means is adjusted to the point at which the alternating current output of the cell is reduced to zero.

2. A range finder according to claim 1 in which the photoelectric cell is infra red sensitive.

3. A range finder comprising an objective for forming in its focus plane an image of the object whose range is to be found, two reflectors approximately parallel to one another positioned to receive light from the object and to reflect it to the focus plane, the objective being in the path of said light, a rotor carrying the two reflectors one near the rim and the other axially, the rotor being rotable about its axis, a beam splitter on said axis for receiving light from the axial reflector and directing it simultaneously to two image planes both optically at the focus plane of the objective, adjustable control means operated in synchronism with the rotor for controlling the amount of movement of the images in the two image planes as the rotor is rotated, means for viewing one of the two image planes, a photoelectric cell behind the other of the two planes, means for indicating the alternating current output of the cell, the diaphragm in said other of the two planes for transmitting to the cell a portion of the image which varies in intensity only when the image is moving, means in said one of the two planes for showing through the viewing means which portion of the image is transmitted through the diaphragm and scale means for indicating the adjustment of said control means when the alternating current output of the cell during rotation of the rotor is reduced to zero.

4. A range finder according to claim 3 in which the showing means are fiducial lines carried on a support and outlining the portions of the image corresponding to the diaphragm aperture and the fiducial lines support and diaphragm are carried on a single detachable support.

5. A range finder according to claim 3 in which the diaphragm is adjustable, and the showing means are adjustable fiducial lines operated in synchronism with the diaphragm.

BENJAMIN E. LUBOSHEZ.